United States Patent
Islam

(10) Patent No.: US 9,235,010 B2
(45) Date of Patent: Jan. 12, 2016

(54) ROBUST OPTICAL CRIMP CONNECTOR

(71) Applicant: Andrew LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 97 days.

(21) Appl. No.: 14/317,953

(22) Filed: Jun. 27, 2014

(65) Prior Publication Data
US 2015/0003784 A1  Jan. 1, 2015

Related U.S. Application Data

(60) Provisional application No. 61/841,202, filed on Jun. 28, 2013.

(51) Int. Cl.
*G02B 6/38* (2006.01)
*G02B 6/44* (2006.01)

(52) U.S. Cl.
CPC ............ *G02B 6/3887* (2013.01); *G02B 6/3879* (2013.01); *G02B 6/4432* (2013.01); *G02B 6/3891* (2013.01); *G02B 6/4416* (2013.01)

(58) Field of Classification Search
CPC ...... G02B 6/32; G02B 6/3816; G02B 6/3879; G02B 6/3887; G02B 6/3891; G02B 6/4416; G02B 6/4488
USPC ........... 385/53, 55, 56, 61–62, 75–78, 86, 88, 385/100, 101, 112, 113
See application file for complete search history.

(56) References Cited

U.S. PATENT DOCUMENTS

| | | | |
|---|---|---|---|
| 5,181,267 A | 1/1993 | Gerace et al. | |
| 5,208,887 A | 5/1993 | Grinderslev | |
| 5,321,784 A | 6/1994 | Cubukciyan et al. | |
| 5,436,995 A | 7/1995 | Yoshizawa et al. | |
| 6,272,273 B1 * | 8/2001 | Bookwalter | G02B 6/4488 385/100 |
| 7,674,131 B2 | 3/2010 | Petersen et al. | |
| 7,802,926 B2 | 9/2010 | Leeman et al. | |
| 7,869,685 B2 | 1/2011 | Hendrickson et al. | |
| 8,070,367 B2 | 12/2011 | Winberg et al. | |
| 8,221,006 B2 | 7/2012 | Theuerkorn | |
| 8,231,282 B2 | 7/2012 | Kuffel et al. | |
| 8,256,969 B2 | 9/2012 | Arai et al. | |
| 8,376,629 B2 | 2/2013 | Cline et al. | |
| 8,388,237 B2 | 3/2013 | Saito et al. | |
| 8,475,055 B2 | 7/2013 | Ciechomski et al. | |
| 8,556,520 B2 | 10/2013 | Elenbaas et al. | |
| 8,714,835 B2 | 5/2014 | Kuffel et al. | |

(Continued)

OTHER PUBLICATIONS

Sung Chul Kang, International Search Report for PCT/US2014/044766, Oct. 16, 2014, Daejeon Metropolitan City, Korea.

*Primary Examiner* — Akm Enayet Ullah
*Assistant Examiner* — Michael Mooney
(74) *Attorney, Agent, or Firm* — Babcock IP, PLLC

(57) ABSTRACT

An optical connector with a cable gland dimensioned for coupling with a body includes a crimp seat with a shoulder dimensioned larger than a bore of the cable gland. A duplex shell is dimensioned to retain a pair of optical connectors; the duplex shell provided with a crimp support. The crimp seat and the crimp support are dimensioned to receive a crimp ferrule and a connect crimp ferrule, respectively, thereover, for securing yarns of an armored cable within the optical connector.

19 Claims, 10 Drawing Sheets

(56) References Cited

U.S. PATENT DOCUMENTS

| | | |
|---|---|---|
| 2003/0059183 A1 | 3/2003 | Militaru |
| 2007/0082552 A1 | 4/2007 | Feldner |
| 2008/0226237 A1* | 9/2008 | O'Riorden ............ G02B 6/3887 385/86 |
| 2010/0215322 A1* | 8/2010 | Matsumoto .......... G02B 6/3879 385/78 |
| 2011/0123157 A1* | 5/2011 | Belsan ................ G02B 6/3816 385/75 |
| 2012/0141086 A1 | 6/2012 | Greub et al. |
| 2012/0155807 A1* | 6/2012 | Knapp .................... G02B 6/32 385/61 |
| 2013/0077922 A1 | 3/2013 | Weimann et al. |
| 2013/0084747 A1 | 4/2013 | Dendas et al. |
| 2013/0243830 A1 | 9/2013 | Shaw et al. |
| 2013/0285741 A1 | 10/2013 | Wright |

* cited by examiner

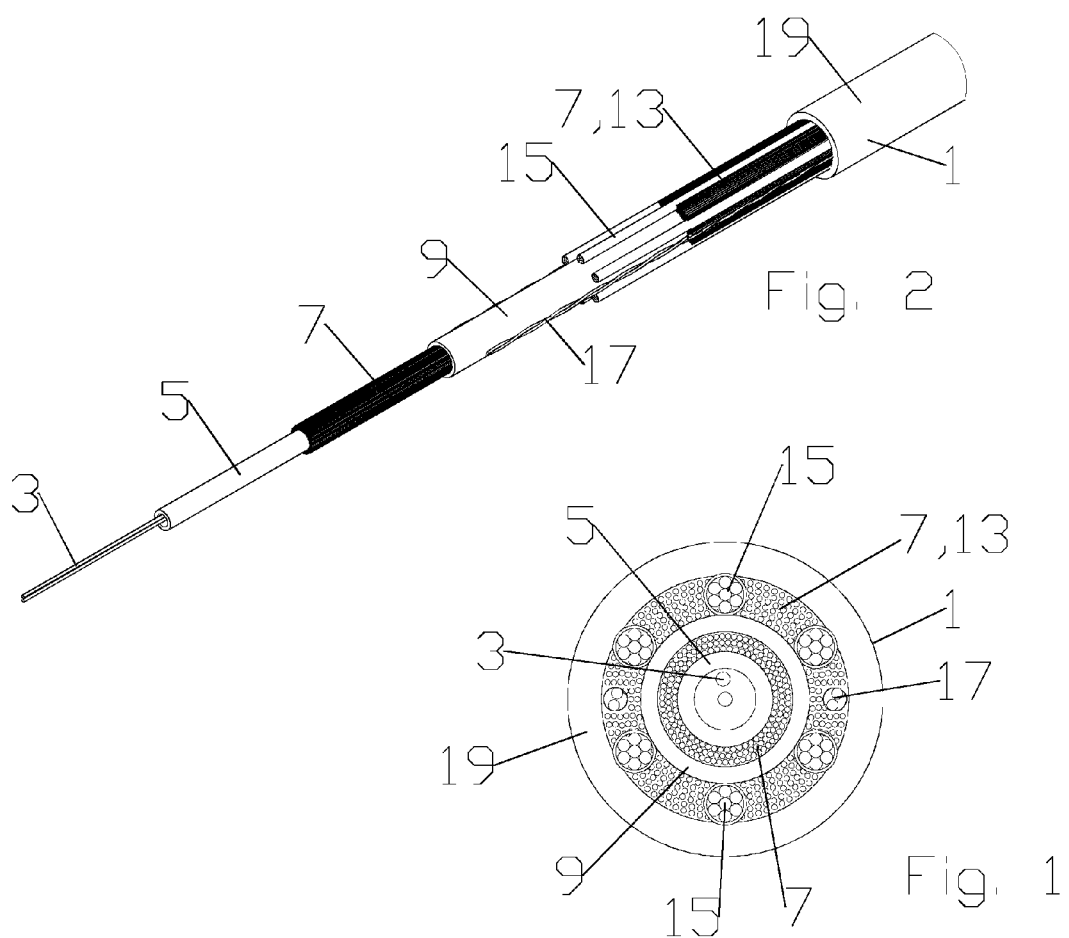

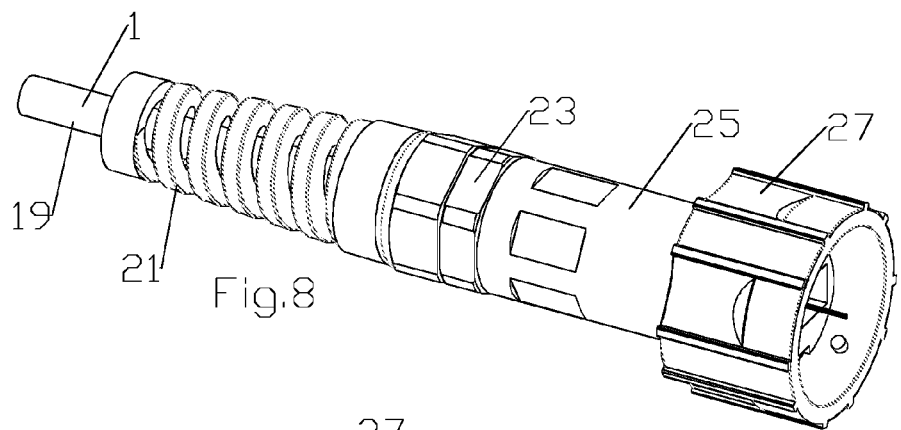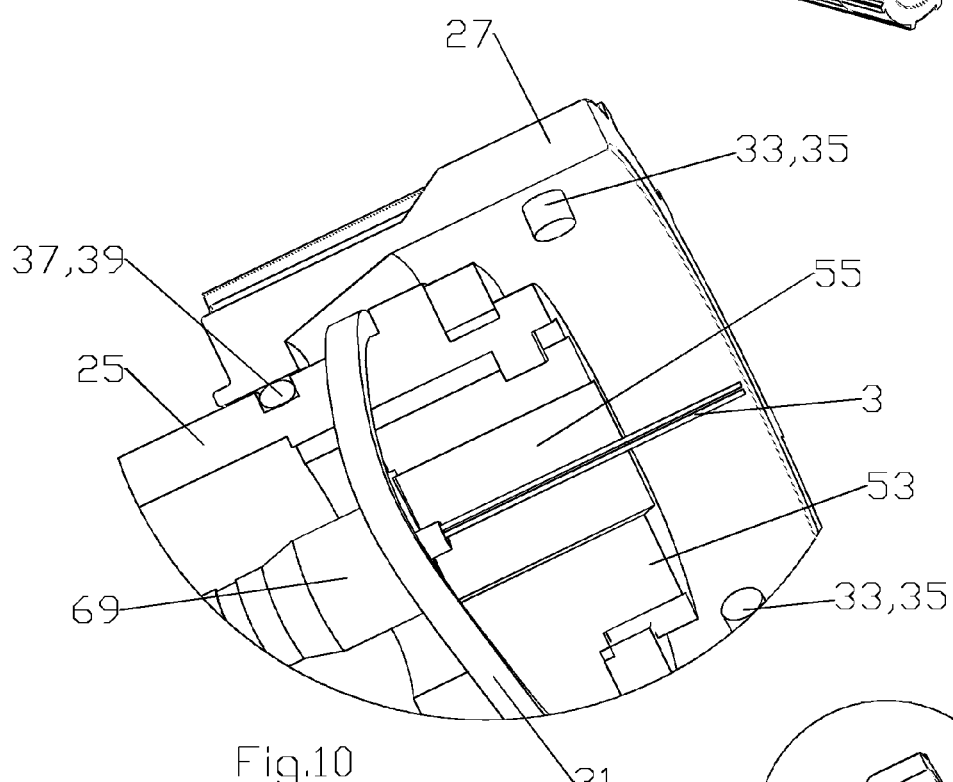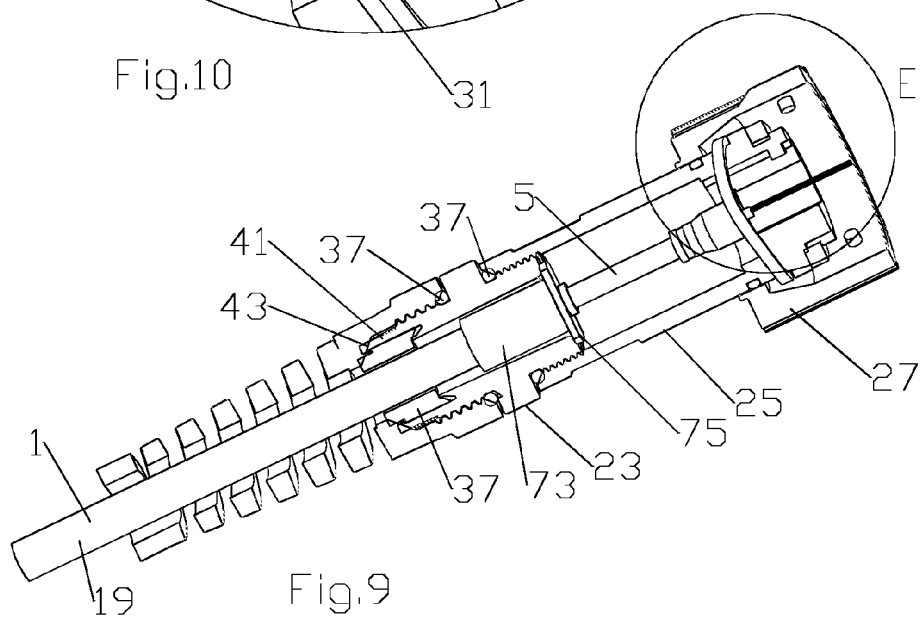

ROBUST OPTICAL CRIMP CONNECTOR

CROSS REFERENCE TO RELATED APPLICATIONS

This application claims the benefit of U.S. Provisional Patent Application titled "Robust Optical Crimp Connector", Ser. No. 61/841,202 filed 28 Jun. 2013 by Nahid Islam, hereby incorporated by reference in the entirety.

BACKGROUND OF THE INVENTION

Optical fiber terminations commonly utilize standard connection interfaces, such as the "Little Connector" (LC) connector interface. Optical cables with two optical fibers may be terminated with a pair of co-located LC connectors, known as a Duplex LC optical cable.

Duplex LC optical cables may apply a crimp connection to secure the LC connectors to Kevlar yarns of the optical cable sheath, to improve a pull strength of the resulting connector to cable interconnection.

Fiber to the Antenna (FTTA) installations transmit data to a tower mounted transceiver, known as a Remote Radio Head (RRH) or Remote Radio Unit (RRU). A single hybrid cable may provide multiple power, signal and/or control cables for an FTTA installation.

FTTA systems enable supply of a factory terminated and sealed hybrid cable wire harness with multiple signal, control and/or power conductors broken out at the RRH/RRU end, each conductor already terminated with the desired connector interface to make the installation process faster, simpler, user friendly, compact and clean.

The typical LC connector and fiber cable interconnection remains a delicate assembly with low tensile strength that may be easily damaged. Also, the LC connector interface does not include environmental sealing to prevent fouling of the interconnection, for example where the interconnection is an external interconnection, such as the broken out optical conductors of a hybrid FTTA cable coupled to RRH/RRU equipment.

A typical optical cable or furcation tube arrangement includes an inner tube through which one or more optical fibers are passed, the tube provided with an aramid fiber and/or yarn sheath to provide a limited level of protection to the optical fibers. However, the fibers may still be damaged by exceeding a bend radius of the cable or crushing forces applied to the cable.

Therefore, it is an object of the invention to provide an optical crimp connector, an optical crimp connector coupled to an armored optical cable and a method of manufacture that overcomes deficiencies in such prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 1 is a schematic end view of an exemplary armored optical cable.

FIG. 2 is a schematic isometric view of the armored optical cable of FIG. 1.

FIG. 8 is a schematic isometric view of an optical connector seated upon an armored optical cable with the duplex shell and LC connectors removed.

FIG. 9 is a schematic partial cut-away side view of the optical connector and cable of FIG. 8.

FIG. 10 is a schematic close-up view of area E of FIG. 9.

DETAILED DESCRIPTION

Figure 3:
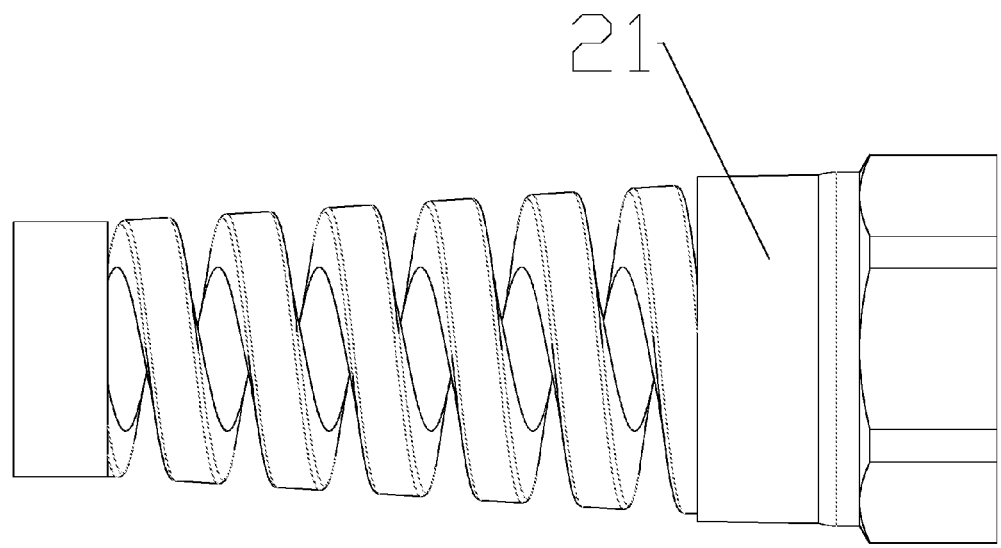
FIG. 3 is a schematic side view of a strain relief of an optical crimp connector.
Figure 4:
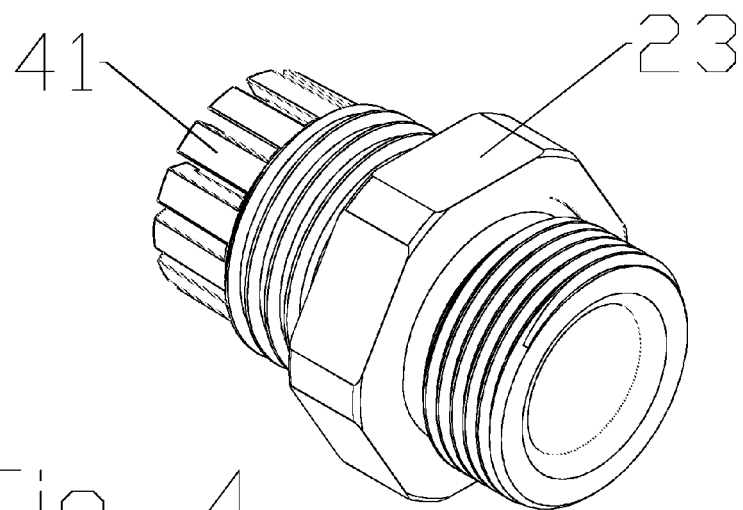
FIG. 4 is a schematic isometric view of a cable gland of an optical crimp connector.
Figure 5:
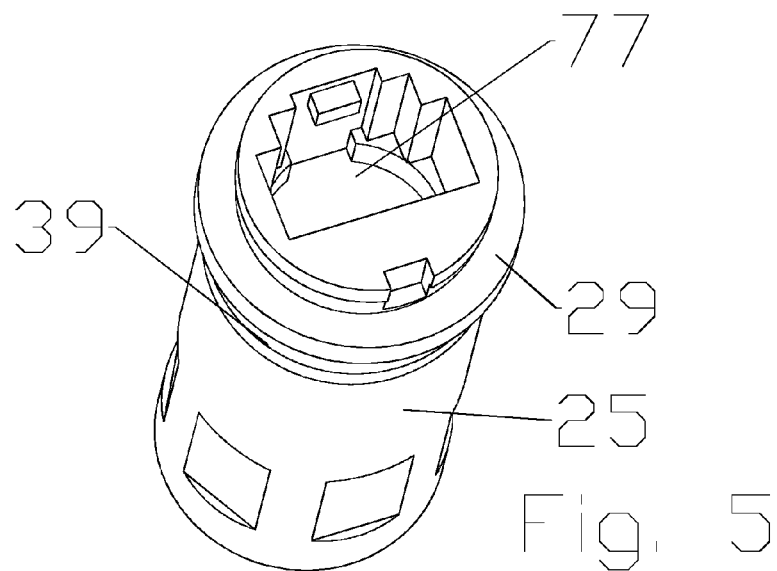
FIG. 5 is a schematic isometric front end view of a body of an optical connector.
Figure 6:
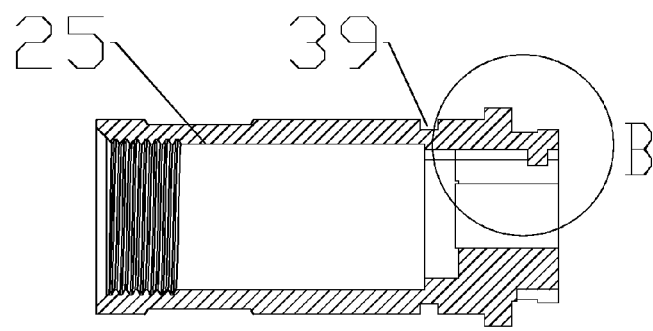
FIG. 6 is a schematic cut-away side view of the body of the optical crimp connector of FIG. 5.
Figure 7:
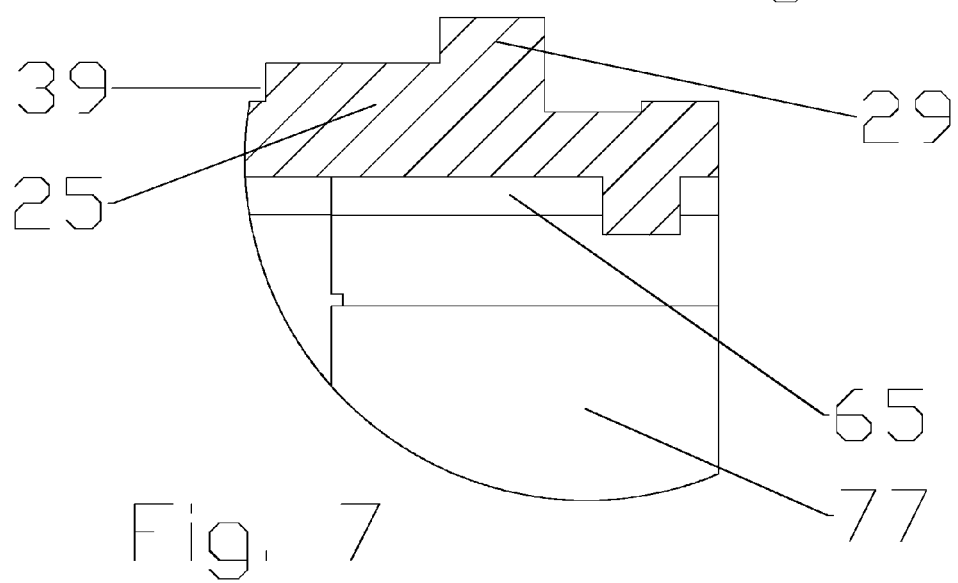
FIG. 7 is a schematic close-up view of area B of FIG. 6.

The inventor has recognized that, even if protected by a furcation tube, an optical fiber terminated in an LC connector has low pull strength due to the relatively weak plastic spring clips (retention tabs) typical of the LC connector interlock with the mating socket to which it is connected. Further, a typical optical fiber furcation tube may provide little or no resistance to damage from exceeding the minimum bend radius of the optical fiber or crushing of the furcation tube and optical fiber therewithin.

An armored optical cable 1 or furcation tube, for example as shown in FIGS. 1 and 2, includes the optical fibers 3 within the inner tube 5 and surrounding layer of aramid yarn 7. Further, the aramid yarn 7 is surrounded by an inner jacket 9, comprising a fiber sub-unit 11/furcation tube. The fiber sub-unit 11 is further enclosed within an outer fiber layer 13 of aramid fibers and/or yarns that may be further reinforced with strength members 15 such as glass reinforced plastic, aramid reinforced plastic or pultruded strength rods. One skilled in the art will appreciate that the presence of the strength members 15 protects the inner tube 5 and optical fibers 3 therewithin from a bend that may exceed the minimum bend radius of the optical fibers 3. Similarly, a rip cord 17 may also be included in the outer fiber layer 13 for ease of stripping back an outer jacket 19 surrounding the outer fiber layer 13 for ease of preparing the end of the armored optical cable 1 or furcation tube for interconnection.

A first exemplary embodiment of a robust duplex LC connector demonstrated in FIGS. 3-22 is adapted to mate with the armored optical cable 1 with separate crimp connections retaining the aramid yarns 7 and the outer fiber layer 13. Thereby, any tension applied to the interconnection from the armored optical cable 1 is primarily handled by the body 25 and not the retention mechanism of the individual LC connectors 45.

A strain relief 21, best shown in FIG. 3, may be coupled to a cable end of a cable gland 23 (best shown in FIG. 4), for example by threading, and a body 25 (see FIGS. 5-7) may be coupled to a connector end of the cable gland 23, also by threading. A coupling nut 27 may be seated upon an outer diameter of the body 25, retained at the cable end by a coupling nut shoulder 29 or the like. A spring element, such as a wave washer 31 (best shown in FIG. 8), or the like may be seated between the coupling nut 27 and the coupling nut shoulder 29 to provide a spring bias for the coupling nut 27 away from the coupling nut shoulder 29. The coupling nut 27 may have an engagement bias for an engagement interface 33, such as a plurality of bayonet prongs 35 which engage a corresponding connection interface, for example provided as a bulkhead connection interface of RRH/RRU equipment or the like, retaining the body 25 and remainder of the interconnection securely against the engagement interface 33.

The robust duplex LC connector installed upon the armored optical cable 1, for example as shown in FIGS. 8-10, may be environmentally sealed. As best shown in FIG. 10, a seal 37, such as an elastomer o-ring, for example seated in an outer diameter seal groove 39 of the body 25, provides an environmental seal between the body 25 and an inner diameter of a cable end of the coupling nut 27. Another seal 37 provided at a cable end of the cable gland 23, between an outer diameter of the outer jacket 19 and an inner diameter of a spring finger array 41 (best shown in FIG. 9) projecting from the cable end of the cable gland 23, is compressed against the outer diameter of the outer jacket 19 as advance of the strain relief 21 upon the cable end of the cable gland 23 initiates contact between the cable end of the spring finger array 41 and a ramp surface 43 of the bore of the strain relief 21, sealing the bore of the cable gland 23 against the outer jacket 19 and mechanically gripping the outer jacket 19. Further seals 37 may be applied to the outer diameter of the cable gland 23, sealing between the cable gland 23 and the strain relief 21 and between the cable gland 23 and the body 25.

Figure 11:
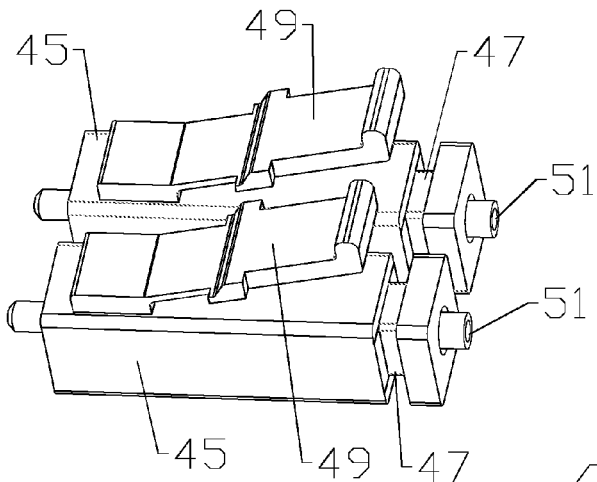
FIG. 11 is a schematic isometric view of a pair of LC connectors.

The LC connectors 45, as shown for example in FIG. 11, are generally rectangular with a circumferential engagement groove 47 and a retention tab 49 according to the standardized LC connector specification. An LC bore 51 through the LC connector 45 may have a lip, radius or chamfer at the interface end stopping an optical fiber 3 inserted therethrough to secure the optical fiber 3 at the end of the bore 51 for interfacing with the optical connection interface the LC connector 45 may be coupled with. The retention tab 49 extends from the LC connector 45 for engaging the optical connection interface.

Figure 12A:
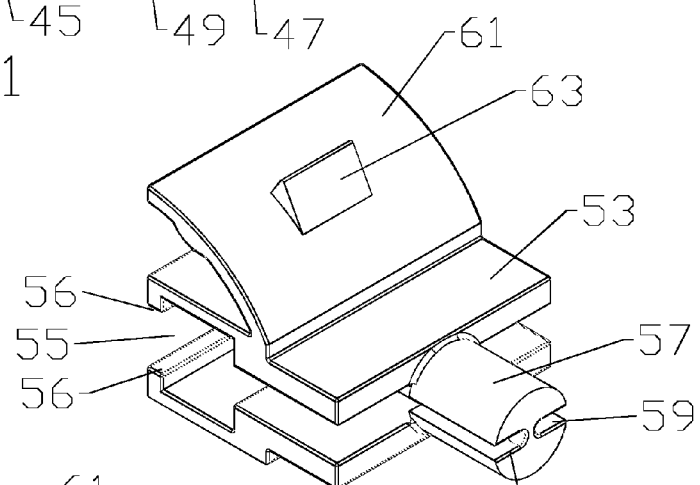
FIG. 12a is a schematic isometric back side view of a duplex shell for an optical connector.
Figure 12B:
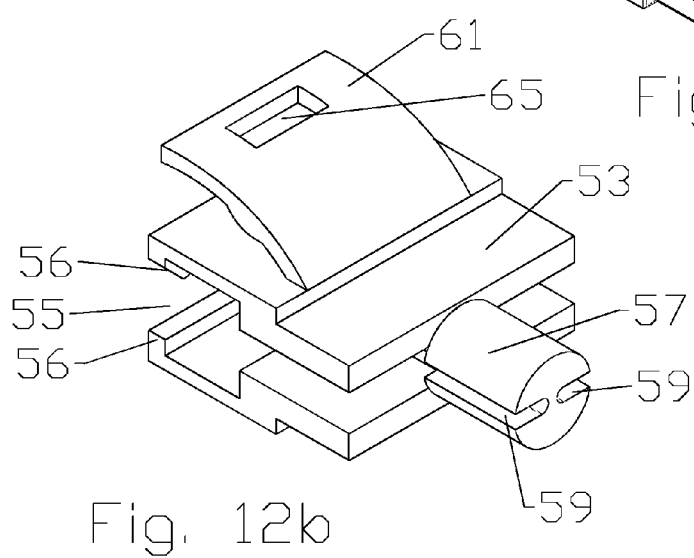
FIG. 12b is a schematic isometric back side view of an alternative duplex shell for an optical connector.
Figure 13:
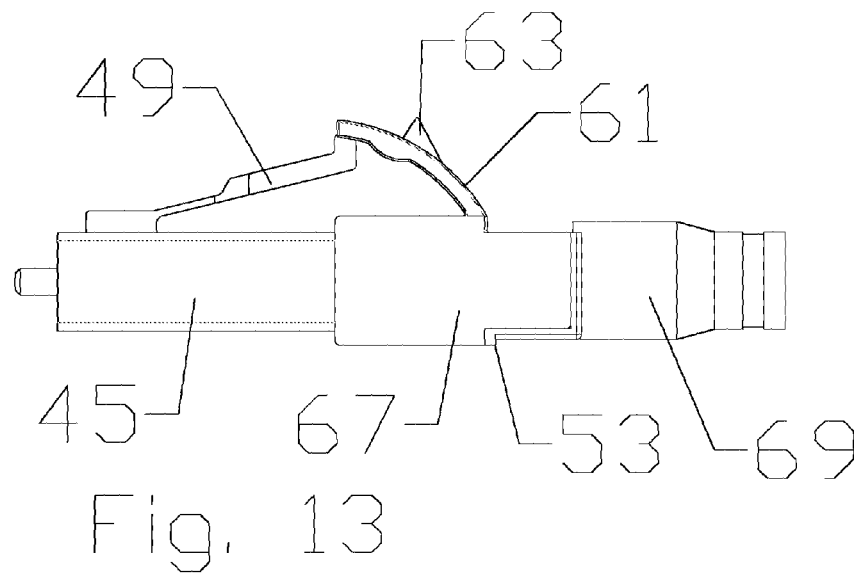
FIG. 13 is a schematic side view of the duplex shell of FIG. 12, with LC connectors and a duplex seal seated thereon.
Figure 14:
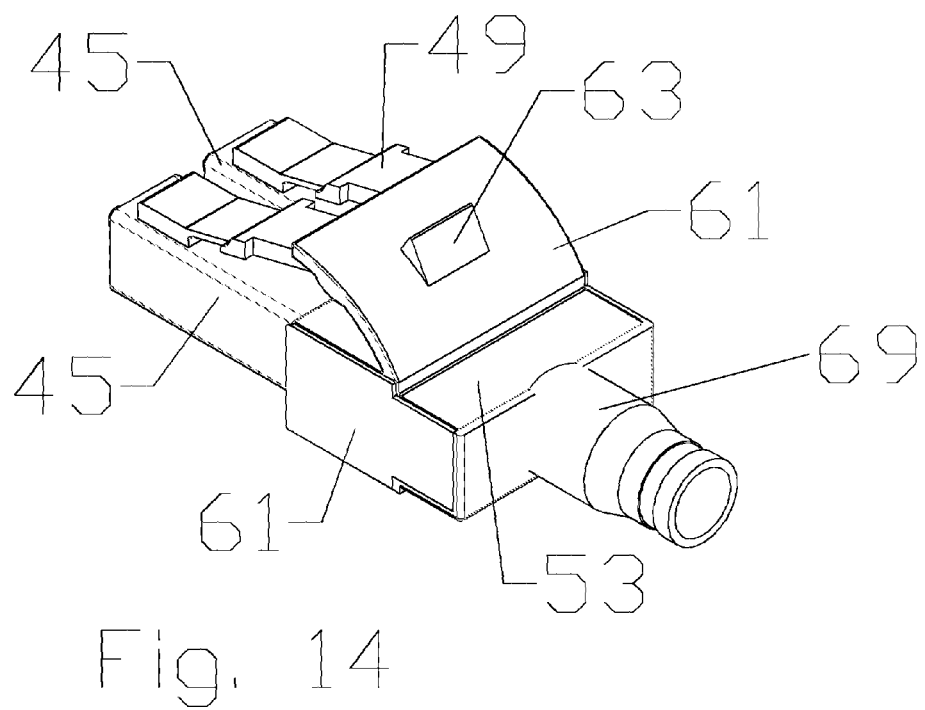
FIG. 14 is a schematic isometric view of the duplex shell assembly of FIG. 13.

In the present duplex configuration, a pair of LC connectors 45 are retained spaced apart, parallel to one another, by a duplex shell 53, as shown for example in FIGS. 12-14. Each LC connector 45 seats within an LC cavity 55 of the duplex shell 53, retained by an engagement shoulders 56, for example, extending from a top and a bottom of the LC cavity 55 to seat within the respective engagement grooves 47, axially securing the LC connectors 45. A crimp support 57 extends from a cable end of the duplex shell 53, with guide grooves 59 at either side, each dimensioned to seat an optical fiber 3 in-line with the respective LC connectors 45. A duplex latch 61 extends from the top of the duplex shell 53 to engage the retention tab 49 of each LC connector 45 and to prevent the retention tabs 49 from extending too far from the LC connector 45 and interfering with the body 25, when the duplex shell 53 is seated therein. The duplex latch 61 has a range of spring movement, enabling it to be compressed toward the LC connectors 45 during insertion. A key 63 may be provided on the duplex latch 61 to engage a corresponding slot 65 of the bore of the body 25, enabling a snap-fit interlock of the duplex shell 53 within the bore of the body 25. Alternatively, the key 63 and slot 65 may be exchanged between the duplex shell 53 and the body 25 as equivalents of one another, for example as shown in FIG. 12b.

Figure 15:
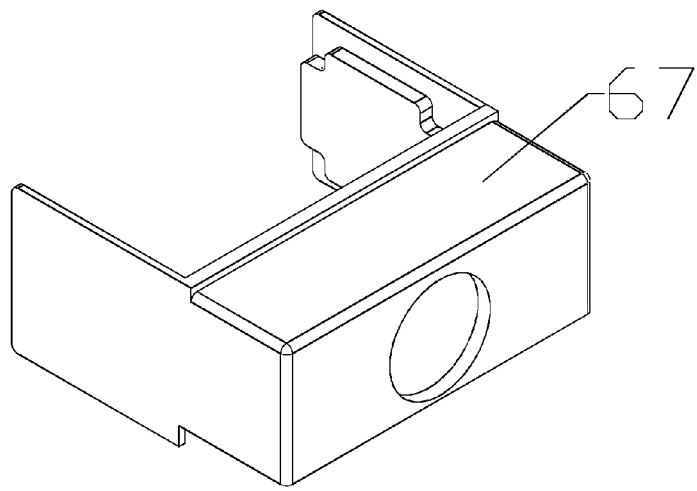
FIG. 15 is a schematic isometric view of a duplex seal.
Figure 16:
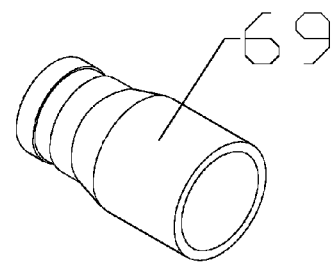
FIG. 16 is a schematic isometric view of a connect crimp ferrule.
Figure 17:
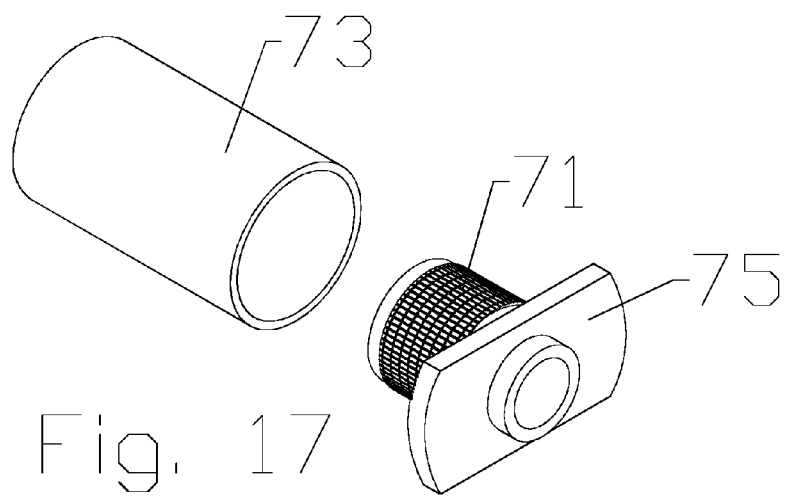
FIG. 17 is a schematic isometric view of a ruggedized crimp ferrule and a crimp seat.

As shown for example in FIG. 15, a duplex seal 67 provided with an aperture for the crimp support 57 to extend therethrough is dimensioned to surround outer portions of the duplex shell 53, including open ends of the LC cavity 55, as shown for example in FIGS. 13 and 14.

The armored optical cable 1 may be secured to the assembly by crimping. A first crimp sandwiches the yarn 7 between the inner tube 5 and the inner jacket 9 between the crimp support 57 of the duplex shell 53 and a connect crimp ferrule 69 (see FIG. 16). A second crimp secures the yarn 7 and/or strength members 15 between the outer diameter of a crimp seat 71 and a ruggedized crimp ferrule 73 (see FIG. 17).

Figure 18:
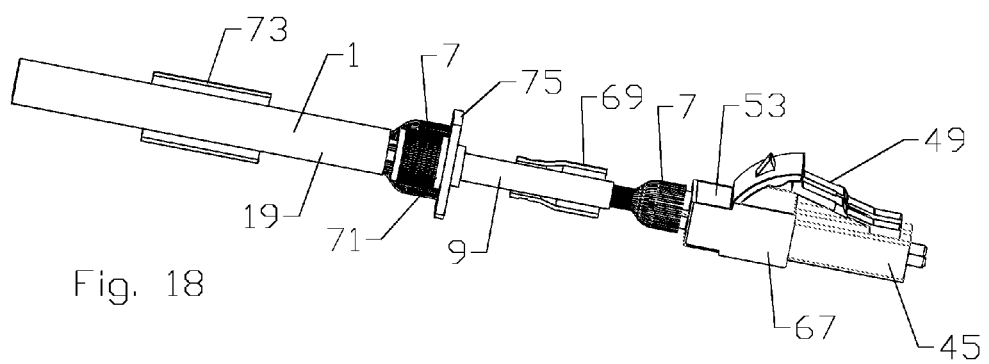
FIG. 18 is a schematic isometric view of an armored cable, crimp seat and duplex shell prior to crimping.
Figure 19:
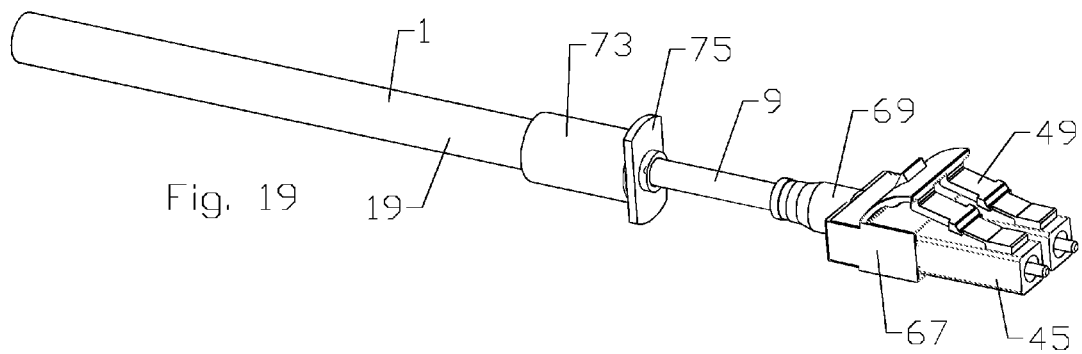
FIG. 19 is a schematic isometric view of the armored cable, crimp seat and duplex shell of FIG. 18, after crimping.

The crimp operations may be performed with the strain relief 21, seal 37, cable gland 23, and body 25 advanced out of the way up the armored optical cable, and the ruggedized crimp ferrule 73 and connect crimp ferrule 69 positioned ready to seat over the respective crimping area/surfaces as shown for example in FIGS. 18 and 19. The body 25 is then seated against the cable gland 23 and the cable gland 23 advanced to abut a shoulder 75 of the crimp seat 71. The shoulder 75 may be dimensioned to pass through a generally rectangular port 75 of the bore of the body 25, the port 75 sized to seat the duplex shell 53 with the key 63 seated within the slot 65. The strain relief 21 is then threaded upon the cable gland 23 to drive the seal 37 proximate the spring finger array 41 radially inward, sealing and mechanically securing the cable gland 23 to the cable end.

Figure 20:
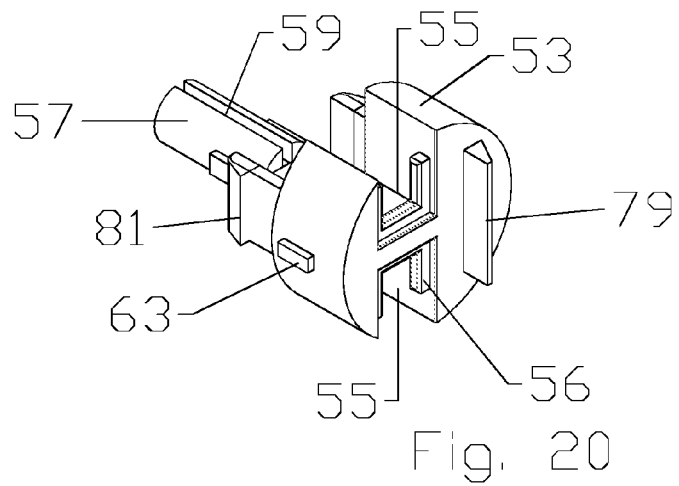
FIG. 20 is a schematic isometric view of an alternative embodiment of a duplex shell.
Figure 21:
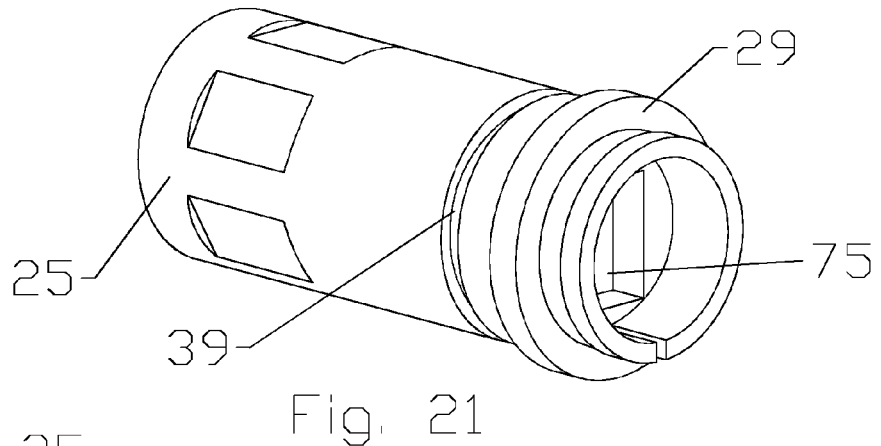
FIG. 21 is a schematic isometric view of a body for the duplex shell of FIG. 20.
Figure 22:
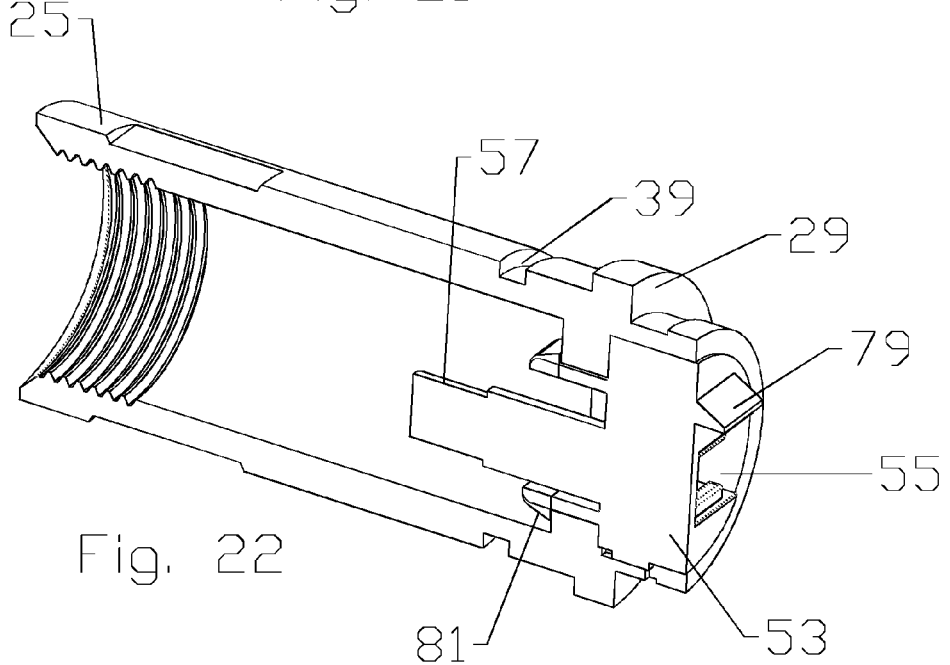
FIG. 22 is a schematic cut-away view of the body of FIG. 21 with the duplex shell of FIG. 21 seated therewithin.

In an alternative embodiment, as shown for example in FIGS. 20-22, the duplex shell 53 may be configured to seat within a generally circular front end bore of the port 75. The duplex latch may be provided as a solid portion, the retention tabs 49 of the LC connectors retained in position, for example, by an outward extending lip 79. Retention of the duplex shell 53 axially within the port 75 may be provided by inward extending retention tabs 81 which key with a cable end of the port 75.

Figure 23:
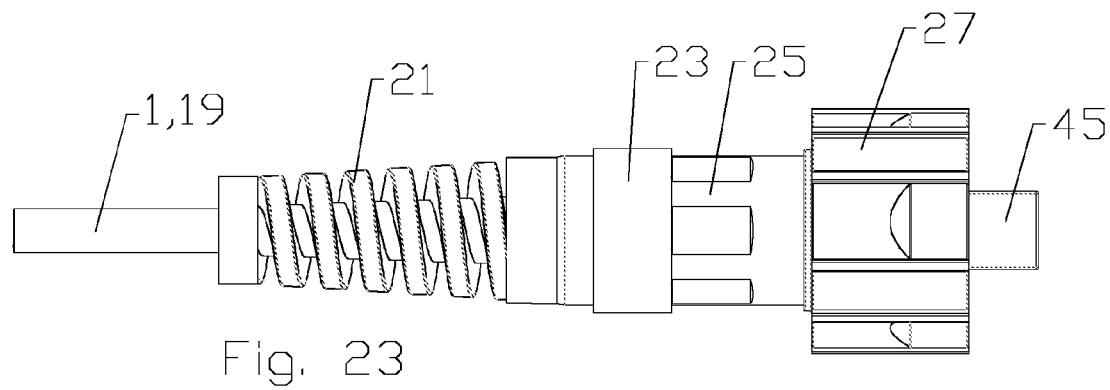
FIG. 23 is a schematic side view of an alternative embodiment of an optical connector mounted upon an armored optical cable.
Figure 24:
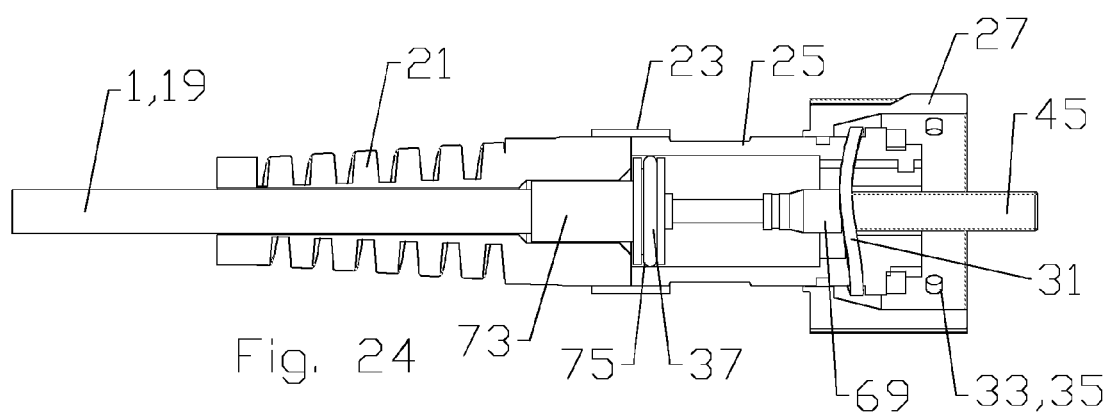
FIG. 24 is a schematic partial cut-away side view of the optical connector and armored optical cable of FIG. 23.
Figure 25:
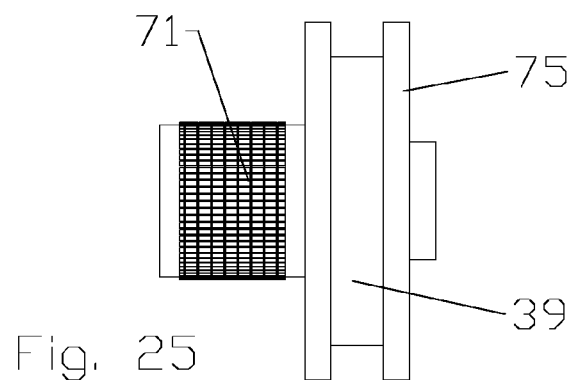
FIG. 25 is a schematic side view of a crimp seat for the optical connector of FIGS. 22 and 23.

In a simplified alternative embodiment, as shown for example in FIGS. 23-25, the strain relief 21 may be coupled directly to the body 25 via a cable gland 23 provided as an outer nut or compression sleeve. Simplified environmental sealing may be applied by providing the crimp seal 71 with a seal groove 39 and seal 37. Further, the connect crimp ferrule 69 may be applied directly to an LC connector 45 that is free floating within the bore of the body 25 (omitting the duplex shell 53.

One skilled in the art will appreciate that one or more of the elements of the assembly may be cost efficiently formed, for example, of polymer material by injection molding.

Because the body 25 and associated elements are securely retained by both the mechanical grip of the seal 37 against the outer jacket 19 and the crimp of the yarn 7 and/or strength members 15 between the crimp seat 71 and the ruggedized crimp ferrule 73, a tear off strength of the assembly is greatly improved over a single crimp between the duplex shell 53 and the yarn 7 of a conventional furcation tube or cable.

Further, the end of the armored optical cable 1 may be fully sealed by the assembly, eliminating the need for interconnections to be located within a further surrounding enclosure.

Although demonstrated with respect to the LC connection interface, one skilled in the art will appreciate that the duplex shell 53 and/or duplex seal 67 may be readily adapted to a wide range of alternative electro-optical connection interfaces.

| Table of Parts | |
| --- | --- |
| 1 | armored optical cable |
| 3 | optical fiber |
| 5 | inner tube |
| 7 | yarn |
| 9 | inner jacket |
| 11 | fiber sub unit |
| 13 | outer fiber layer |
| 15 | strength member |
| 17 | rip cord |
| 19 | outer jacket |
| 21 | strain relief |
| 23 | cable gland |
| 25 | body |
| 27 | coupling nut |
| 29 | coupling nut shoulder |
| 31 | wave washer |
| 33 | engagement interface |
| 35 | bayonet prongs |
| 37 | seal |
| 39 | seal groove |
| 41 | spring finger array |
| 43 | ramp surface |
| 45 | LC connector |
| 47 | engagement groove |
| 49 | retention tab |
| 51 | LC bore |
| 53 | duplex shell |
| 55 | LC cavity |
| 56 | engagement shoulder |
| 57 | crimp support |
| 59 | guide grooves |
| 61 | duplex latch |
| 63 | key |
| 65 | slot |
| 67 | duplex seal |
| 69 | connect crimp ferrule |
| 71 | crimp seat |
| 73 | ruggedized crimp ferrule |
| 75 | shoulder |
| 77 | port |
| 79 | lip |
| 81 | retention tab |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. An optical connector, comprising: a cable gland dimensioned for coupling with a body; a crimp seat with a shoulder; the shoulder dimensioned larger than a bore of the cable gland; a duplex shell seated within a bore of the body, the duplex shell dimensioned to retain a pair of optical connectors; the duplex shell provided with a crimp support; the crimp seat and the crimp support dimensioned to receive a crimp ferrule and a connect crimp ferrule, respectively, thereover; further including a strain relief coupled to a cable end of the cable gland; a spring finger array of the cable gland projecting from a cable end of the cable gland and a seal; the strain relief provided with a bore with a ramp surface, the ramp surface dimensioned to drive the spring finger array radial inward compressing the seal against an outer diameter of the armored optical cable.

2. The optical connector of claim 1, wherein the duplex shell is interlocked with the bore of the body.

3. The optical connector of claim 1, wherein an outer diameter of the crimp support is provided with a pair of guide grooves along a longitudinal axis of the crimp support, the guide grooves dimensioned to each receive an optical fiber.

4. The optical connector of claim 1, further including a duplex seal with an aperture for the crimp support of the duplex shell to pass through, the duplex seal dimensioned to seal a sidewall of a horizontal cavity of the duplex shell.

5. The optical connector of claim 1, wherein the duplex shell retains the optical connectors via an LC cavity which keys with an engagement groove of the optical connectors.

6. The optical connector of claim 1, wherein the duplex shell includes a duplex latch which contacts retention tabs extending from the optical connectors.

7. The optical connector of claim 6, further including a duplex latch with a slot thereon, the slot dimensioned to engage the body, retaining the duplex shell within the bore of the body.

8. The optical connector of claim 1, wherein the duplex shell is retained axially within a bore of the body by at least one inward extending retention tab of the duplex shell dimensioned to key with a cable end of a port of the bore of the body.

9. The optical connector of claim 1, further including a coupling nut provided coupled to the body, the coupling nut spring biased away from an interface end of the body.

10. The optical connector of claim 9, wherein the coupling nut includes an engagement interface for coupling the body against a corresponding connection interface.

11. The optical connector of claim 10, wherein the engagement interface is at least one bayonet prong projecting inward from an inner diameter of the coupling nut.

12. The optical connector of claim 1, wherein the duplex shell is coupled to the body by a retention tab which engages a cable end of a port of the body dimensioned to receive the duplex shell therewithin.

13. The optical connector of claim 1, wherein the shoulder is dimensioned to pass through a port of the body, the port dimensioned to receive the duplex shell.

14. The optical connector of claim 1, wherein the cable gland and the body are coupled together via threads.

15. The optical connector of claim 2, wherein the cable gland is a sleeve seated upon an outer diameter of the body and the strain relief.

16. The optical connector of claim 1, further including an armored optical cable comprising a plurality of optical fibers within an inner tube;
- a layer of yarn surrounding the inner tube,
- the yarn surrounded by an inner jacket and the inner jacket surrounded by an outer fiber layer of yarn and the outer fiber layer surrounded by an outer jacket;
- the layer of yarn crimped between the crimp support and the connect crimp ferrule; the outer fiber layer of yarn crimped between the crimp seat and the ruggedized crimp ferrule.

17. The optical connector of claim 16, wherein the outer fiber layer includes at least one strength member.

18. An armored optical cable terminated by an optical connector, comprising: the armored optical cable including a plurality of optical fibers within an inner tube; a layer of aramid yarn surrounding the inner tube, the aramid yarn surrounded by an inner jacket and the inner jacket surrounded by an outer fiber layer of aramid yarn and the outer fiber layer surrounded by an outer jacket; the optical connector including a cable gland dimensioned for coupling with a body; a crimp seat with a shoulder; the shoulder dimensioned larger than a bore of the cable gland; a duplex shell dimensioned to retain a pair of optical connectors; the duplex shell provided with a crimp support; further including a strain relief coupled to a cable end of the cable gland; a spring finger array of the cable gland projecting from a cable end of the cable gland and a seal; the strain relief provided with a bore with a ramp surface, the ramp surface dimensioned to drive the spring finger array radial inward compressing the seal against an outer diameter of the armored optical cable; the layer of aramid yarn surrounding the inner tube crimped upon the crimp support; and the outer fiber layer crimped upon the crimp seat.

19. The armored cable terminated by an optical connector of claim 18, wherein the cable gland is coupled to a strain relief, the strain relief biasing a cable end of the cable gland against the outer jacket of the armored optical cable.

* * * * *